US012573141B2

(12) United States Patent
Choe et al.

(10) Patent No.: US 12,573,141 B2
(45) Date of Patent: Mar. 10, 2026

(54) METHOD AND DEVICE FOR LEARNING 3D MODEL RECONSTRUCTION

(71) Applicant: UIF (University Industry Foundation), Yonsei University, Seoul (KR)

(72) Inventors: Yoonsik Choe, Seoul (KR); Taehyeon Kim, Seongnam-si (KR); Jiho Lee, Jeju-si (KR); Gihwan Lee, Seongnam-si (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 159 days.

(21) Appl. No.: 18/539,162

(22) Filed: Dec. 13, 2023

(65) Prior Publication Data

US 2024/0203049 A1 Jun. 20, 2024

(30) Foreign Application Priority Data

Dec. 14, 2022 (KR) ........................ 10-2022-0174420

(51) Int. Cl.
*G06T 17/00* (2006.01)

(52) U.S. Cl.
CPC .................................. *G06T 17/00* (2013.01)

(58) Field of Classification Search
CPC ........... G06T 17/00; G06T 2207/20084; G06T 2207/20081; G06T 2207/10028; G06T 17/10; G06T 5/60; G06T 19/00; G06T 2210/56; G06T 7/66; G06T 7/60; G06F 18/22; G06F 18/2413
See application file for complete search history.

(56) References Cited

U.S. PATENT DOCUMENTS 9,852,511 B2 12/2017 Gao et al.
2009/0322749 A1* 12/2009 Kassab ..................... G06T 7/66
345/424

FOREIGN PATENT DOCUMENTS

KR 10-2261881 B1 6/2021
KR 10-2347232 B1 1/2022

OTHER PUBLICATIONS

Jiho Lee, et al., "Fine Detailed Feature Learning for Single View 3D Reconstruction", MDPI, Version Aug. 22, 2022 submitted to Appl. Sci., https://www.mdpi.com/journal/applsci, 12 pages.
Zhile Ren, et al., "Three-Dimensional Object Detection and Layout Prediction using Clouds of Oriented Gradients", 2016 IEEE Conference on Computer Vision and Pattern Recognition, DOI 10.1109/CVPR.2016.169, 9 pages.

(Continued)

*Primary Examiner* — Hau H Nguyen
(74) *Attorney, Agent, or Firm* — Park, Kim & Suh, LLC

(57) ABSTRACT

Disclosed is a learning method for reconstructing a three-dimensional (3D) model performed by at least one processor including extracting a point related to an object in a learning image from the learning image for a 3D reconstruction model, obtaining a gradient map including surrounding context information in three dimensions of the point from a 3D model of the object, determining a weight of the point based on the learning image and the gradient map, and learning the 3D reconstruction model by using the weight such that the 3D model of the object is output from the 3D reconstruction model into which the learning image is entered.

7 Claims, 7 Drawing Sheets

400

Extract point associated with object in learning image from learning image for 3D reconstruction model — S410

Obtain gradient map including surrounding context information on three dimensions of point from 3D model of object — S420

Determine weight of point based on learning image and gradient map — S430

Learn 3D reconstruction model by using weight such that 3D model of object is output from 3D reconstruction model into which learning image is entered — S440

(56)          References Cited

OTHER PUBLICATIONS

Shizhan Zhu, et al., "Differentiable Gradient Sampling for Learning Implicit 3D Scene Reconstructions from a Single Image", Published as a conference paper at ICLR 2022, 29 pages.
Zhiqin Chen, et al., "Learning Implicit Fields for Generative Shape Modeling", arXiv:1812.02822v5 [cs.GR], Sep. 16, 2019, 10 pages.

* cited by examiner

| | Gx | Gy | Gz |
|---|---|---|---|
| a | 0 | 0 | 0 |
| b | 0 | 0 | 1 |
| c | 0 | 1 | 1 |
| d | 1 | 1 | 1 |
| e | 0 | 0 | 2 |
| f | 0 | 1 | 2 |
| g | 1 | 1 | 2 |
| h | 1 | 2 | 2 |
| i | 2 | 2 | 2 |

<u>100</u>

<u>210</u>

| | Gx | Gy | Gz |
|---|---|---|---|
| a | 0 | 0 | 0 |
| b | 0 | 0 | 1 |
| c | 0 | 1 | 1 |
| d | 1 | 1 | 1 |
| e | 0 | 0 | 2 |
| f | 0 | 1 | 2 |
| g | 1 | 1 | 2 |
| h | 1 | 2 | 2 |
| i | 2 | 2 | 2 |

100

220

|   | Gx | Gy | Gz |
|---|---|---|---|
| a | 0 | 0 | 0 |
| b | 0 | 0 | 1 |
| c | 0 | 1 | 1 |
| d | 1 | 1 | 1 |
| e | 0 | 0 | 2 |
| f | 0 | 1 | 2 |
| g | 1 | 1 | 2 |
| h | 1 | 2 | 2 |
| i | 2 | 2 | 2 |

100

230

300

(a) Input (b) Ground truth (c) Original (d) Gradient-applied - MethodA (e) Gradient-applied - MethodB

FIG. 4

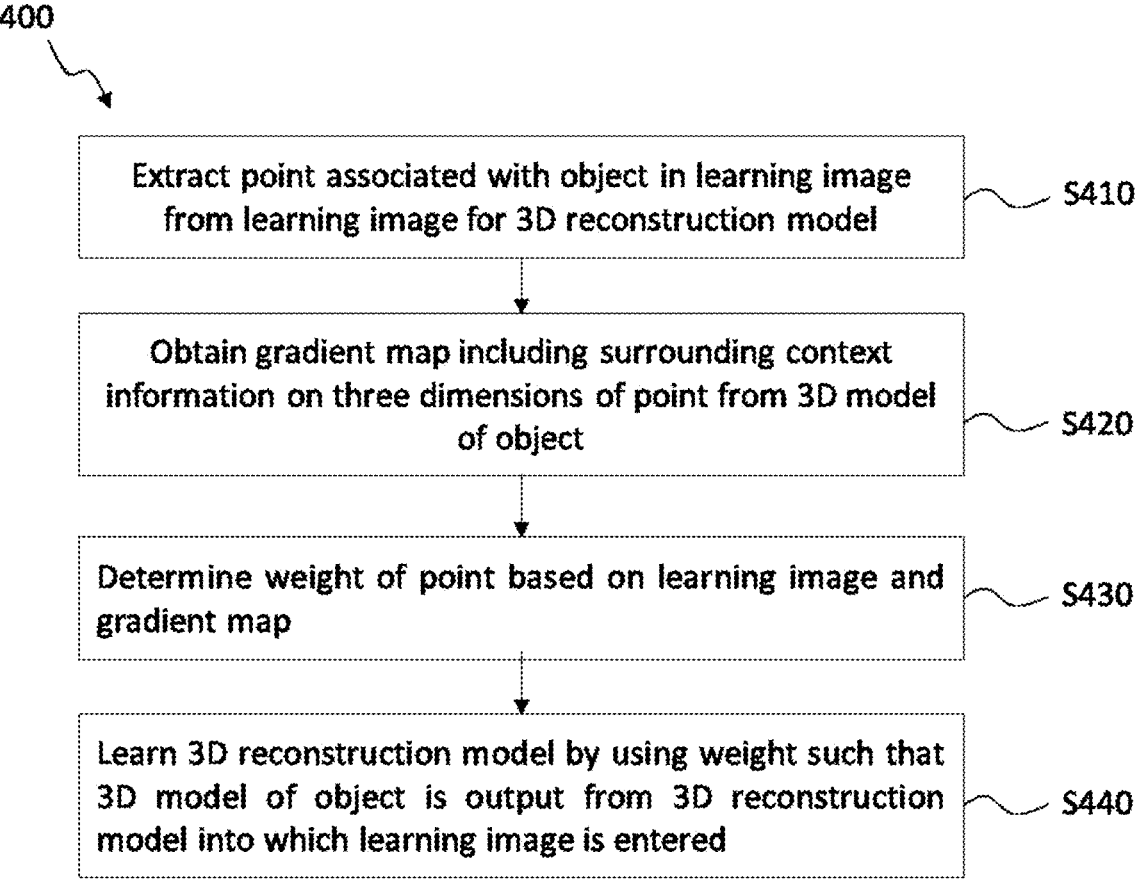

400

Extract point associated with object in learning image from learning image for 3D reconstruction model    S410

Obtain gradient map including surrounding context information on three dimensions of point from 3D model of object    S420

Determine weight of point based on learning image and gradient map    S430

Learn 3D reconstruction model by using weight such that 3D model of object is output from 3D reconstruction model into which learning image is entered    S440

METHOD AND DEVICE FOR LEARNING 3D MODEL RECONSTRUCTION

CROSS-REFERENCE TO RELATED APPLICATIONS

This application claims priority under 35 U.S.C. § 119 to Korean Patent Application No. 10-2022-0174420 filed on Dec. 14, 2022, in the Korean Intellectual Property Office, the disclosures of which are incorporated by reference herein in their entireties.

BACKGROUND

Embodiments of the present disclosure described herein relate to a learning device for three-dimensional (3D) model reconstruction, and a method thereof.

Conventionally, studies on deep neural networks for processing 3D data have been actively conducted. The studies are expanding into application technologies such as 3D geometric analysis, 3D synthesis, and 3D auxiliary image analysis. However, although many methods have been proposed to process the representation of the 3D data, most of the introduced representations are not compatible with conventional neural networks for one-dimensional (1D) and two-dimensional (2D) data and there are limitations in terms of resolution.

SUMMARY

Embodiments of the present disclosure provide a learning device for 3D model reconstruction that enables compatibility between 3D data and an existing 2D model, and a method thereof.

According to an embodiment, a learning method for reconstructing a three-dimensional (3D) model performed by at least one processor includes extracting a point related to an object in a learning image from the learning image for a 3D reconstruction model, obtaining a gradient map including surrounding context information in three dimensions of the point from a 3D model of the object, determining a weight of the point based on the learning image and the gradient map, and learning the 3D reconstruction model by using the weight such that the 3D model of the object is output from the 3D reconstruction model into which the learning image is entered.

According to an embodiment, the surrounding context information may include information associated with at least one of a first voxel change amount in an x-axis direction with respect to the point, a second voxel change amount in a y-axis direction with respect to the point, and a third voxel change amount in a z-axis direction with respect to the point.

According to an embodiment, the weight may be determined based on the number of voxel change amounts, each of which has a value greater than or equal to a threshold value, from among the first voxel change amount, the second voxel change amount, and the third voxel change amount.

According to an embodiment, the number of voxel change amounts and the weight may be configured to have a positive correlation.

According to an embodiment, the 3D reconstruction model may be configured to perform single-view 3D reconstruction (SVR) for the learning image.

According to an embodiment, the learning of the 3D reconstruction model by using the weight such that the 3D model of the object is output from the 3D reconstruction model, into which the learning image is entered, may include learning the 3D reconstruction model by using a loss function according to the weight such that the 3D model of the object is output from the 3D reconstruction model into which the learning image is entered.

According to an embodiment, the point may correspond to a boundary of the object.

According to an embodiment, a learning device for 3D model reconstruction includes a memory that stores a learning image, a 3D model of an object within the learning image, and a 3D reconstruction model, and at least one processor connected to the memory. The at least one processor may extract a point related to the object in the learning image from the learning image for the 3D reconstruction model, may obtain a gradient map including surrounding context information in three dimensions of the point from the 3D model of the object, may determine a weight of the point based on the learning image and the gradient map, and may learn the 3D reconstruction model by using the weight such that the 3D model of the object is output from the 3D reconstruction model into which the learning image is entered.

According to an embodiment, A computer-readable recording medium which records a computer program to perform the learning method for a 3D model reconstruction according to claim 1.

BRIEF DESCRIPTION OF THE FIGURES

The above and other objects and features of the present disclosure will become apparent by describing in detail embodiments thereof with reference to the accompanying drawings.

FIG. 4 is a flowchart of a learning method for 3D model reconstruction, according to an embodiment of the present disclosure.

DETAILED DESCRIPTION

Figure 1:
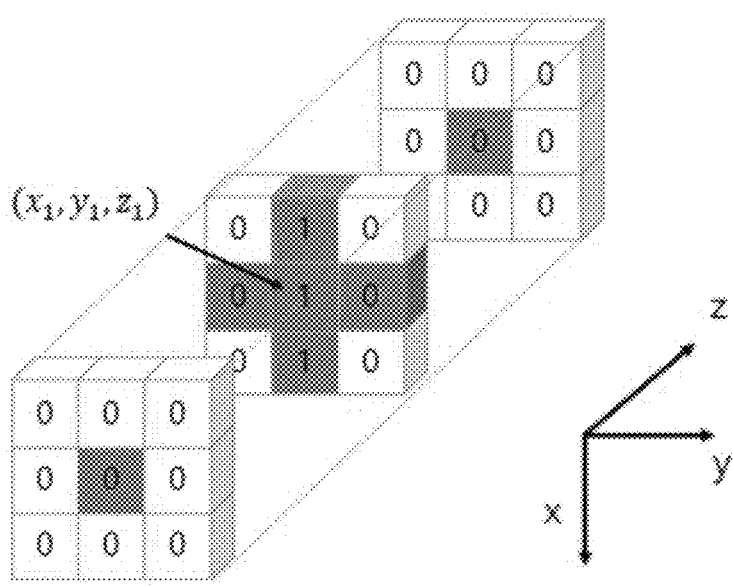
FIG. 1 is a schematic diagram showing a part of a learning method for 3D model reconstruction, according to an embodiment of the present disclosure.

Hereinafter, details for implementing the present disclosure will be described in detail with reference to the accompanying drawings. However, in the following description, when there is a risk of unnecessarily obscuring the gist of the present disclosure, detailed descriptions of well-known functions or configurations will be omitted.

In the accompanying drawings, identical or corresponding components are assigned the same reference numerals. Moreover, in the description of embodiments below, descriptions of the same or corresponding components may be omitted to avoid redundancy. However, even though descriptions regarding components are omitted, it is not intended that such components are not included in any embodiment.

The above and other aspects, features and advantages of the present disclosure will become apparent from embodiments to be described in conjunction with the accompanying drawings. However, the present disclosure may be embodied in various different forms, and should not be construed as being limited only to the illustrated embodiments. Rather, these embodiments are provided as examples such that the present disclosure will be thorough and complete, and will fully convey the scope of the present disclosure to those skilled in the art.

Terms used in this specification will be briefly described, and the disclosed embodiments will be described in detail. Although certain general terms widely used in this specification are selected to describe embodiments in consideration of the functions thereof, these general terms may vary according to intentions of one of ordinary skill in the art, case precedents, the advent of new technologies, and the like. Terms arbitrarily selected by the applicant of the embodiments may also be used in a specific case. In this case, their meanings are given in the detailed description of the present disclosure. Hence, these terms used in the present disclosure may be defined based on their meanings and the contents of the present disclosure, not by simply stating the terms.

Expressions in the singular used in this specification include a plurality of expressions unless interpreted otherwise in context. A plurality of expressions includes expressions in the singular unless the context clearly dictates that the expression is plural. It will be understood that the terms "comprises," "comprising," "includes" and/or "including," when used herein, specify the presence of stated elements and/or components, but do not preclude the presence or addition of one or more other elements and/or components.

In the meantime, the learning operation(s) for 3D model reconstruction described later in FIGS. 1 to 4 may be performed by a computing device including a memory that stores a learning image, a 3D model of an object in the learning image, and a 3D reconstruction model, and at least one processor connected to the memory. In detail, the learning operation(s) for the 3D model reconstruction may be performed by the at least one processor of the computing device.

FIG. 1 is a schematic diagram showing a part of a learning method for 3D model reconstruction, according to an embodiment of the present disclosure. In detail, the schematic diagram in FIG. 1 shows a step of obtaining surrounding information of a first point (x1, y1, z1) to determine a learning amount (i.e., weight) of the first point (x1, y1, z1).

First of all, preceding operations of the learning device for 3D model reconstruction need to be described. First, at least one processor of the device may extract a point associated with an object in a learning image from the learning image for the 3D reconstruction model. Here, the point associated with the object may refer to any point (e.g., the first point (x1, y1, z1), etc.) that constitutes the 3D model of the object. In this case, a value of any point constituting the 3D model of the object may be displayed as 1. On the other hand, any point that does not constitute an object (e.g., corresponding to an empty space) may be displayed as 0. Additionally, the learning image may refer to 2D data obtained by capturing the object and/or 2D data obtained through a single-view from a 3D model of the object.

Referring to FIG. 1, the processor may obtain surrounding context information of the first point (x1, y1, z1) from the 3D model of an existing object. The surrounding context information may refer to information indicating the relationship between the first point (x1, y1, z1), which is a target point, and each of points adjacent to the first point (x1, y1, z1). For example, the context information may include change amount (0) information between a value of the first point (x1, y1, z1) and a value of a point adjacent to the upper part on a x-axis, and change amount (0) information between the value of the first point (x1, y1, z1) and a value of a point adjacent to the lower part on the x-axis. For another example, the context information may include change amount (1) information between the value of the first point (x1, y1, z1) and a value of a point adjacent to the left part on a y-axis, and change amount (1) information between the value of the first point (x1, y1, z1) and a value of a point adjacent to the right part on the y-axis. Similarly, the context information may also include change amount information in a z-axis direction. In the meantime, the sum of the change amounts of each of the adjacent points is referred to as a "voxel change amount".

The processor may obtain a gradient map including the context information. Here, the gradient map may refer to 2D data including the voxel change amount information according to each of the x, y, and z axes of a point. Then, the processor may determine the weight of the point based on the learning image and the gradient map. For example, because an x-axis voxel change amount, a y-axis voxel change amount, and a z-axis voxel change amount are 0, 2, and 2 in the case of the first point (x1, y1, z1), respectively, the processor may determine the weight of the first point (x1, y1, z1) based on the number of change amounts (here, a y-axis change amount and a z-axis change amount), which is 2 and which has a value greater than or equal to a predetermined threshold value of 2. In this case, the number of change amounts having a value greater than or equal to the threshold value, and a weight may have a positive correlation. In other words, as the number of change amounts having a value greater than or equal to the threshold value increases, the weight may increase.

The processor may learn a 3D reconstruction model by using the weight such that the 3D model of the object is output from the 3D reconstruction model into which the learning image is entered. In particular, the processor may obtain a loss function based on the weight, and may learn the 3D reconstruction model by using the obtained loss function. Here, the 3D reconstruction model may refer to a conventional arbitrary model (e.g., single-view 3D reconstruction (SVR) model) configured to output 3D data from 2D data and a 3D reconstruction model redesigned based on the gradient map thus obtained in advance. As such, according to the learning method of the present disclosure, the 3D reconstruction model may be implemented by additionally applying a gradient map to a conventional model without entering 3D data.

Meanwhile, a process of calculating a voxel change amount of a point extracted from a learning image is described in detail later with reference to FIGS. 2A, 2B, 2C, 3A, 3B, and 4.

Figure 2A:
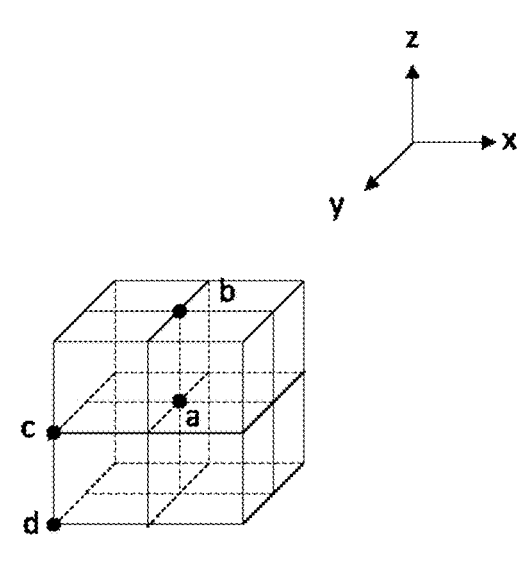
FIG. 2A shows a first example of a learning method for 3D model reconstruction, according to an embodiment of the present disclosure.

FIG. 2A shows a first example of a learning method for 3D model reconstruction, according to an embodiment of the present disclosure. Here, a first 3D model 210 is a part of the 3D model of an arbitrary object. Points 'a' to 'd' denote point(s) extracted from a learning image indicating the corresponding object. And, table 100 is a result of calculating a voxel change amount of each point(s).

As shown in FIG. 2A, in each of the points 'a' to 'd', the number of voxel change amounts, each of which has a threshold value of 2 or more, is 0. Referring again to the first 3D model 210, it may be seen that the points 'a' to 'd' correspond to an inside, a surface, an edge, and a vertex of the first 3D model 210, respectively. In particular, points corresponding to the inside or the surface of the 3D model are not helpful in reconstructing a 3D model in detail. Accordingly, the processor may determine weights of the points 'a' and 'b' as relatively low values. In the meantime, as such, when the threshold value is set to 2, a high weight may not be assigned to point(s) corresponding to the one edge and one vertex of the first 3D model 210, in the case of the points 'c' and 'd'. To this end, the processor may set the threshold value to 1. Alternatively, a condition of the threshold value may be set differently depending on the change amount. For example, a relatively high weight w1 may be assigned to points, each of which has the number of voxel change amounts of 2 is greater than or equal to 1. However, a relatively high weight w2 may be assigned to points, each of which has the number of voxel change amounts of 1 is greater than or equal to 2 even when there is no voxel change amount of 2. However, a relatively low weight w3 may be assigned to points, each of which has the number of voxel change amounts of 2 is 0, and each of change amounts having the threshold value of 2 or more is 1, is determined as w1, the weight of the point 'h', which has the number of voxel change amounts having the threshold value of 2 or more is 2, may be determined as a value greater than w1.

Figure 3A:
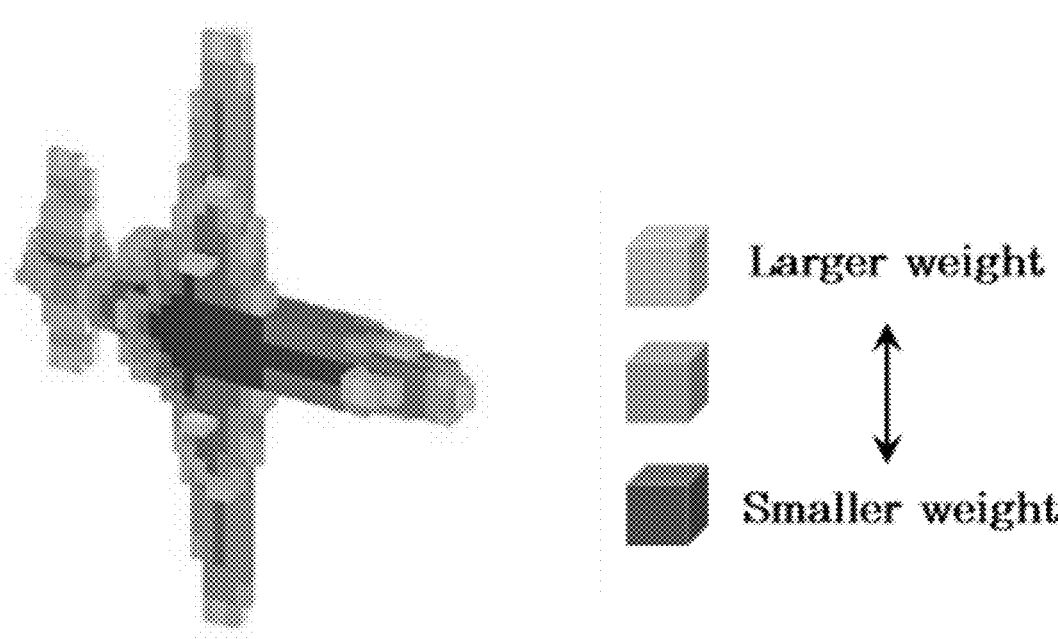
FIG. 3A shows an example of a gradient map, according to an embodiment of the present disclosure.

FIG. 3A shows an example of a gradient map 300, according to an embodiment of the present disclosure. As shown in FIG. 3A, each of points of an object (here, an 'airplane') extracted from a learning image may be displayed as a weight with different values on the gradient map 300.

Figure 3B:
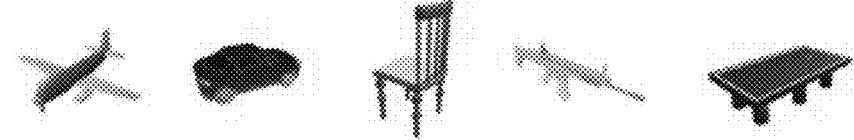
FIG. 3B is an example showing a result according to a learning method for 3D model reconstruction, according to an embodiment of the present disclosure.
Figure 3B:
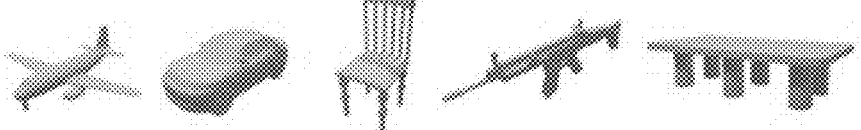
Figure 3B:
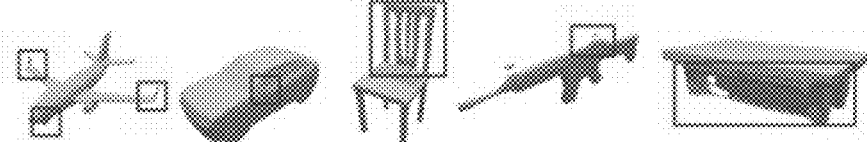
Figure 3B:
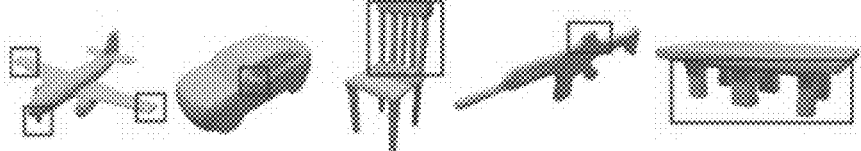
Figure 3B:
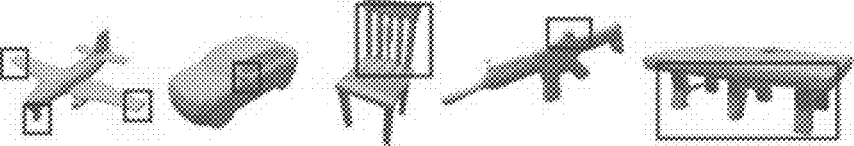

FIG. 3B is an example showing a result according to a learning method for 3D model reconstruction, according to an embodiment of the present disclosure. As shown in FIG. 3B, according to Method A and Method B, the 3D model reconstructed according to the method of the present disclosure, it is seen that a boundary of an object is clearly expressed like answer data (ground truth) derived from input data (Input). On the other hand, it is seen that the boundary of the object is somewhat ambiguous and unclear when the conventional method (Original) is compared to the method of the present disclosure. The result may also be identified through Table 1 below.

TABLE 1

| Metric | Model | Plane | Car | Chair | Rifle | Table |
|---|---|---|---|---|---|---|
| Mean | Original[26] | 57.58 ± 15.53 | 82.77 ± 9.10 | 48.19 ± 18.65 | 49.21 ± 12.52 | 53.11 ± 16.87 |
| IoU(×100) | MethodA | 59.14 ± 15.75 | 83.63 ± 9.20 | 49.22 ± 18.84 | 50.37 ± 13.58 | 55.48 ± 17.60 |
| | MethodB | 59.82 ± 15.53 | 82.70 ± 9.10 | 48.88 ± 18.79 | 49.70 ± 13.32 | 55.50 ± 17.46 |
| MSE(×0.1) | Original[26] | 99.33 ± 81.66 | 231.33 ± 134.91 | 499.68 ± 325.89 | 89.52 ± 74.50 | 553.64 ± 396.20 |
| | MethodA | 96.25 ± 84.48 | 218.65 ± 135.74 | 494.61 ± 315.94 | 88.30 ± 74.72 | 525.88 ± 380.48 |
| | MethodB | 95.89 ± 83.67 | 233.37 ± 135.67 | 497.99 ± 325.14 | 89.17 ± 72.05 | 532.95 ± 393.41 | which has the number of voxel change amounts of 1 is smaller than or equal to 1. In this case, w1 may be greater than or equal to w2, and w2 may be greater than or equal to w3.

Figure 2B:
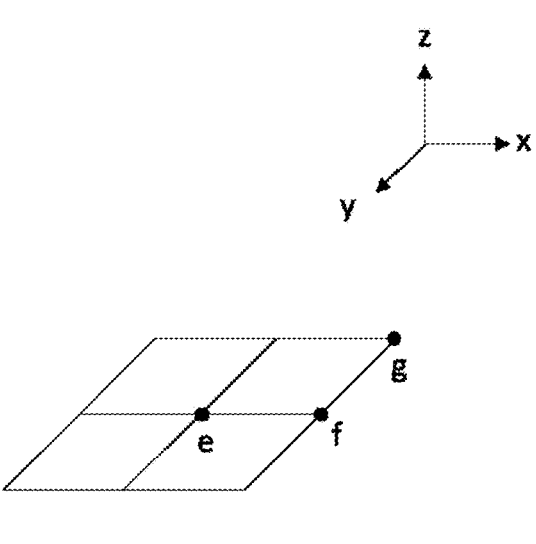
FIG. 2B shows a second example of a learning method for 3D model reconstruction, according to an embodiment of the present disclosure.

FIG. 2B shows a second example of a learning method for 3D model reconstruction, according to an embodiment of the present disclosure. Here, a second 3D model 220 is a part of the 3D model of an arbitrary object. Points 'e' to 'g' denote point(s) extracted from a learning image indicating the corresponding object.

As shown in FIG. 2B, in each of the points 'e' to 'g', the number of voxel change amounts, each of which has a threshold value of 2 or more, is 1. Accordingly, a processor may determine the weight of each of the points 'e' to 'g' to a relatively high value (e.g., w1 in FIG. 2A).

Figure 2C:
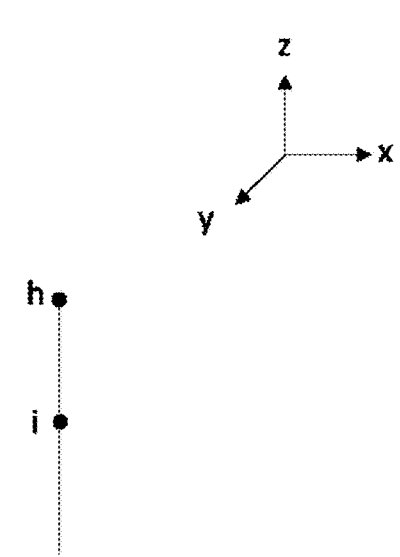
FIG. 2C shows a third example of a learning method for 3D model reconstruction, according to an embodiment of the present disclosure.

FIG. 2C shows a third example of a learning method for 3D model reconstruction, according to an embodiment of the present disclosure. Here, a third 3D model 230 is a part of the 3D model of an arbitrary object. Points 'h' and 'i' denote point(s) extracted from a learning image indicating the corresponding object.

As shown in FIG. 2C, in the point 'h', the number of voxel change amounts, each of which has a threshold value of 2 or more, is 2. In the point 'i', the number of voxel change amounts, each of which has a threshold value of 2 or more, is 3. Accordingly, a processor may determine the weight of each of the points 'h' and 'i' to a relatively high value (e.g., w1 in FIG. 2A). Additionally or alternatively, the processor may determine the weight differently depending on the number of voxel change amounts, each of which has a maximum threshold value of 2 or higher. For example, when the weight of the point 'g', which has the number of voxel FIG. 4 is a flowchart of a learning method 400 for 3D model reconstruction, according to an embodiment of the present disclosure. The method 400 may be performed by at least one processor of a computing device as described above.

First of all, a learning method for reconstructing a 3D model may start a step S410 of extracting a point associated with an object in a learning image from the learning image for a 3D reconstruction model. Here, a point may correspond to a boundary of an object.

The processor may obtain a gradient map including surrounding context information on three dimensions of the point from a 3D model of the object (S420). In this case, the surrounding context information may include information associated with at least one of a first voxel change amount in an x-axis direction with respect to the point, a second voxel change amount in a y-axis direction with respect to the point, and a third voxel change amount in a z-axis direction with respect to the point. Accordingly, the weight may be determined based on the number of voxel change amounts, each of which has a value greater than or equal to a threshold value, from among the first voxel change amount, the second voxel change amount, and the third voxel change amount. In the meantime, the number of voxel change amounts and the weight are configured to have a positive correlation.

In FIG. 4, a second step S420 is shown as being performed after the first step S410, but an embodiment is not limited thereto. In detail, the first step S410 and the second step S420 may be performed in parallel.

Then, the processor may determine the weight of the point based on the learning image and the gradient map (S430). Then, the processor may learn a 3D reconstruction model by using the weight such that the 3D model of the object is output from the 3D reconstruction model into which the learning image is entered (S440). For example, the processor may learn the 3D reconstruction model by using a loss function according to the weight such that the 3D model of the object is output from the 3D reconstruction model into which the learning image is entered. In this case, the 3D reconstruction model may be configured to perform SVR for the learning image.

The previous description of the present disclosure is provided to enable those skilled in the art to make or use the present disclosure. Various modifications of the present disclosure will be easily apparent to those skilled in the art, and the generic principles defined herein may be applied to various modifications without departing from the spirit or scope of the present disclosure. Accordingly, the present disclosure is not intended to be limited to the examples set forth herein, but is to be accorded the widest scope consistent with the principles and novel features disclosed herein. Although the present disclosure has been described herein in connection with some embodiments, it should be understood that various modifications and changes may be made without departing from the scope of the present disclosure as understood by those skilled in the art to which the present disclosure pertains. Moreover, such modifications and variations are intended to fall within the scope of claims appended hereto.

According to some embodiments of the present disclosure, a 3D model similar to an actual 3D model of an object may be reconstructed.

According to some embodiments of the present disclosure, the compatibility with an existing 2D model may be improved by using only a gradient map and a learning image as input data, not the 3D model.

According to some embodiments of the present disclosure, the computational burden of a learning model may be reduced by using only the gradient map and the learning image as input data, not the 3D model.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A learning method for reconstructing a three-dimensional (3D) model performed by at least one processor, the method comprising:
   extracting a point related to an object in a learning image from the learning image for a 3D reconstruction model;
   obtaining a gradient map including surrounding context information in three dimensions of the point from a 3D model of the object;
   determining a weight of the point based on the learning image and the gradient map; and
   learning the 3D reconstruction model by using the weight such that the 3D model of the object is output from the 3D reconstruction model into which the learning image is entered,
   wherein the surrounding context information includes information associated with at least one of a first voxel change amount in an x-axis direction with respect to the point, a second voxel change amount in a y-axis direction with respect to the point, and a third voxel change amount in a z-axis direction with respect to the point, and
   wherein the weight is determined based on the number of voxel change amounts, each of which has a value greater than or equal to a threshold value, from among the first voxel change amount, the second voxel change amount, and the third voxel change amount.

2. The method of claim 1, wherein the number of voxel change amounts and the weight are configured to have a positive correlation.

3. The method of claim 1, wherein the 3D reconstruction model is configured to perform single-view 3D reconstruction (SVR) for the learning image.

4. The method of claim 1, wherein the learning of the 3D reconstruction model by using the weight such that the 3D model of the object is output from the 3D reconstruction model, into which the learning image is entered, includes:
   learning the 3D reconstruction model by using a loss function according to the weight such that the 3D model of the object is output from the 3D reconstruction model into which the learning image is entered.

5. The method of claim 1, wherein the point corresponds to a boundary of the object.

6. A learning device for 3D model reconstruction, the learning device comprising:
   a memory configured to store a learning image, a 3D model of an object within the learning image, and a 3D reconstruction model; and
   at least one processor connected to the memory,
   wherein the at least one processor is configured to:
   extract a point related to the object in the learning image from the learning image for the 3D reconstruction model;
   obtain a gradient map including surrounding context information in three dimensions of the point from the 3D model of the object;
   determine a weight of the point based on the learning image and the gradient map; and
   learn the 3D reconstruction model by using the weight such that the 3D model of the object is output from the 3D reconstruction model into which the learning image is entered,
   wherein the surrounding context information includes information associated with at least one of a first voxel change amount in an x-axis direction with respect to the point, a second voxel change amount in a y-axis direction with respect to the point, and a third voxel change amount in a z-axis direction with respect to the point, and
   wherein the weight is determined based on the number of voxel change amounts, each of which has a value greater than or equal to a threshold value, from among the first voxel change amount, the second voxel change amount, and the third voxel change amount.

7. A non-transitory computer-readable recording medium which records a computer program to perform the learning method for a 3D model reconstruction according to claim 1.

* * * * *